United States Patent
Sinha et al.

(10) Patent No.: US 8,593,964 B1
(45) Date of Patent: Nov. 26, 2013

(54) METHOD AND SYSTEM FOR TRAFFIC MANAGEMENT

(75) Inventors: Rishi Sinha, San Jose, CA (US); Vineet Abraham, Sunnyvale, CA (US); Sathish K. Gnanasekaran, Sunnyvale, CA (US); Badrinath Kollu, San Jose, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 856 days.

(21) Appl. No.: 12/614,256

(22) Filed: Nov. 6, 2009

(51) Int. Cl.
*G01R 31/08* (2006.01)

(52) U.S. Cl.
USPC .......................................... 370/235

(58) Field of Classification Search
USPC ................................. 370/229–240
See application file for complete search history.

(56) References Cited

U.S. PATENT DOCUMENTS

| | | | |
|---|---|---|---|
| 5,633,861 A | 5/1997 | Hanson | |
| 5,638,359 A | 6/1997 | Peltola | |
| 5,719,853 A | 2/1998 | Ikeda | |
| 5,970,048 A | 10/1999 | Pajuvirta | |
| 5,987,008 A | 11/1999 | Simpson et al. | |
| 6,014,383 A | 1/2000 | McCarty | |
| 6,091,725 A | 7/2000 | Cheriton | |
| 6,122,251 A | 9/2000 | Shinohara | |
| 6,160,793 A | 12/2000 | Ghani | |
| 6,185,189 B1 | 2/2001 | Brassier | |
| 6,233,236 B1 | 5/2001 | Nelson | |
| 6,381,642 B1 | 4/2002 | O'Donnell | |
| 6,427,114 B1 | 7/2002 | Olsson | |
| 6,724,722 B1 | 4/2004 | Wang | |
| 6,771,596 B1 | 8/2004 | Angle et al. | |
| 7,145,868 B2 | 12/2006 | Giroux | |
| 7,216,192 B2 | 5/2007 | Boulay et al. | |
| 7,292,580 B2 | 11/2007 | Ramamurthy et al. | |
| 7,430,164 B2 * | 9/2008 | Bare | 370/217 |
| 7,633,861 B2 | 12/2009 | Willhite | |
| 2004/0075401 A1 | 4/2004 | Segan et al. | |
| 2004/0218531 A1 * | 11/2004 | Cherian et al. | 370/235 |
| 2006/0056308 A1 | 3/2006 | Gusat et al. | |
| 2007/0070901 A1 | 3/2007 | Aloni | |
| 2008/0181111 A1 * | 7/2008 | Felter et al. | 370/232 |

OTHER PUBLICATIONS

U.S. Appl. No. 12/614,286 entitled "Back Pressure Remediation," filed Nov. 6, 2009.
U.S. Appl. No. 12/614,268 entitled "Presentation of a Selected Port," filed Nov. 6, 2009.
U.S. Appl. No. 12/614,254 entitled "Automatic Switch Port Selection," filed Nov. 6, 2009.

* cited by examiner

*Primary Examiner* — Kwang B Yao
*Assistant Examiner* — Tung Q Tran
(74) *Attorney, Agent, or Firm* — Wong, Cabello, Lutsch, Rutherford & Brucculeri, L.L.P.

(57) ABSTRACT

One embodiment of the present invention provides a system that facilitates traffic management in a network. During operation, the system detects a bottleneck in a network based on network-state information received from one or more switches. The system further identifies a data flow that contributes to the bottleneck and generates a signal to reduce the data flow from the data flow's source device.

14 Claims, 10 Drawing Sheets

METHOD AND SYSTEM FOR TRAFFIC MANAGEMENT

RELATED APPLICATION

The subject matter of this application is related to the subject matter in the following co-pending non-provisional applications:

"Automatic Switch Port Selection," by inventors Michael Atkinson, Vineet Abraham, Sathish Gnanasekaran, and Rishi Sinha, having Ser. No. 12/614,254, and a filing date of 6 Nov. 2009, "Presentation of a Selected Port," by inventors Michael Atkinson, Vineet Abraham, Sathish Gnanasekaran, and Rishi Sinha, having a Ser. No. 12/614,268, and a filing date of 6 Nov. 2009, and "Back Pressure Remediation," by inventors Vineet Abraham, Sathish Gnanasekaran, Rishi Sinha, and Badrinath Kollu, having a Ser. No. 12/614,286, and a filing date of 6 Nov. 2009, the disclosure of which is incorporated by reference herein in its entirety.

BACKGROUND

1. Field

The present disclosure relates to network traffic management. More specifically, the present disclosure relates to a method and system for facilitating identification, isolation, and removal of bottlenecks in a network.

2. Related Art

The proliferation of the Internet and e-commerce continues to fuel revolutionary changes in the network industry. Today, a significant number of transactions, from real-time stock trades to retail sales, auction bids, and credit-card payments, are conducted online. Consequently, many enterprises rely on existing storage area networks (SANs), not only to perform conventional storage functions such as data backup, but also to carry out an increasing number of egalitarian network functions, such as building large server farms.

Historically, conventional network appliances (e.g., data-center servers, disk arrays, backup tape drives) mainly use an SAN network to transfer large blocks of data. Therefore, the switches provide only basic patch-panel-like functions. In the past decade, however, drastic advances occurred in almost all the network layers, ranging from physical transmission media, computer hardware and architecture to operating system (OS) and application software.

For example, a single-wavelength channel in an optical fiber can provide 10 Gbps of transmission capacity. With wavelength-division-multiplexing (WDM) technology, a single strand of fiber can provide 40, 80, or 160 Gbps aggregate capacity. Meanwhile, computer hardware is becoming progressively cheaper and faster. Expensive high-end servers can now be readily replaced by a farm of many smaller, cheaper, and equally fast computers. In addition, OS technologies, such as virtual servers and virtual storage, have unleashed the power of fast hardware and provide an unprecedentedly versatile computing environment.

As a result of these technological advances, a conventional SAN switch fabric faces a much more heterogeneous, versatile, and dynamic environment. The limited network and traffic management functions in such switches can hardly meet these demands. For instance, applications are dynamically provisioned on virtual servers and can be quickly moved from one virtual server to another as their workloads change over time. Virtual storage applications automatically move data from one storage tier to another and these movements are dictated by access patterns and data retention policies. This dynamic movement of application workloads and data can create unexpected bottlenecks, which in turn causes unpredictable congestion among different switches in the network.

SUMMARY

In embodiments of the present invention, the problem of network congestion and channel under-utilization is solved by detecting bottleneck channels in the network, identifying contributing data flows, and automatically limiting the data rate of the sources of such data flows.

One embodiment of the present invention provides a system that facilitates traffic management in a network. During operation, the system detects a bottleneck in a network based on network-state information received from one or more switches. The system further identifies a data flow that contributes to the bottleneck and generates a signal to reduce the data flow from the data flow's source device.

In a variation on this embodiment, the network-state information is collected in real time.

In a variation on this embodiment, the network-state information indicates one or more of the following: whether a channel is experiencing a slow drain, whether a channel is fully or nearly fully utilized and experiencing congestion, and whether a channel is coupled to an edge device.

In a variation on this embodiment, a bottleneck is a primary bottleneck channel on a switch when the channel is experiencing congestion while being fully or nearly fully utilized, or when the channel is coupled to an edge device and receives insufficient credits from the edge device, which prevents the channel from being fully or nearly fully utilized.

In a variation on this embodiment, to identify the data flow, the system represents the switches in the network in a data structure that corresponds to the network topology. The system further maps the received network-state information to the network topology represented by the data structure to identify a data path which is affected by the bottleneck.

In a further variation, the system issues a query to a data channel corresponding to the bottleneck. In response to the query, the system receives information which identifies one or more data flows transmitted via the bottleneck channel. The system then determines one or more of the data flows to be offending data flows which contribute to the bottleneck, based on the identified data path which is affected by the bottleneck.

In a variation on this embodiment, the signal is configured to instruct the source device to limit the data rate on a host bus adapter on the source device.

In a variation on this embodiment, a channel is a physical link or a virtual channel on a physical link.

In a variation on this embodiment, the system indicates a port on a switch to which an edge device can be coupled based at least on the detected bottleneck.

One embodiment of the present invention provides a system that facilitates traffic management in a network. During operation, the system monitors traffic on a channel on a switch. The system further determines whether the channel is a bottleneck, and reports congestion-related information to a traffic-management entity.

In a variation on this embodiment, the channel is determined to be a bottleneck when: the channel experiences a slow drain on a receiving entity coupled to the channel, or the channel receives more traffic to be transmitted onto the channel than the bandwidth of the channel allows.

In a variation on this embodiment, the channel experiences slow drain when the credits returned by the receiving entity coupled to the channel are insufficient to maintain full or nearly full utilization of the channel's bandwidth.

DETAILED DESCRIPTION

Figure 1A:
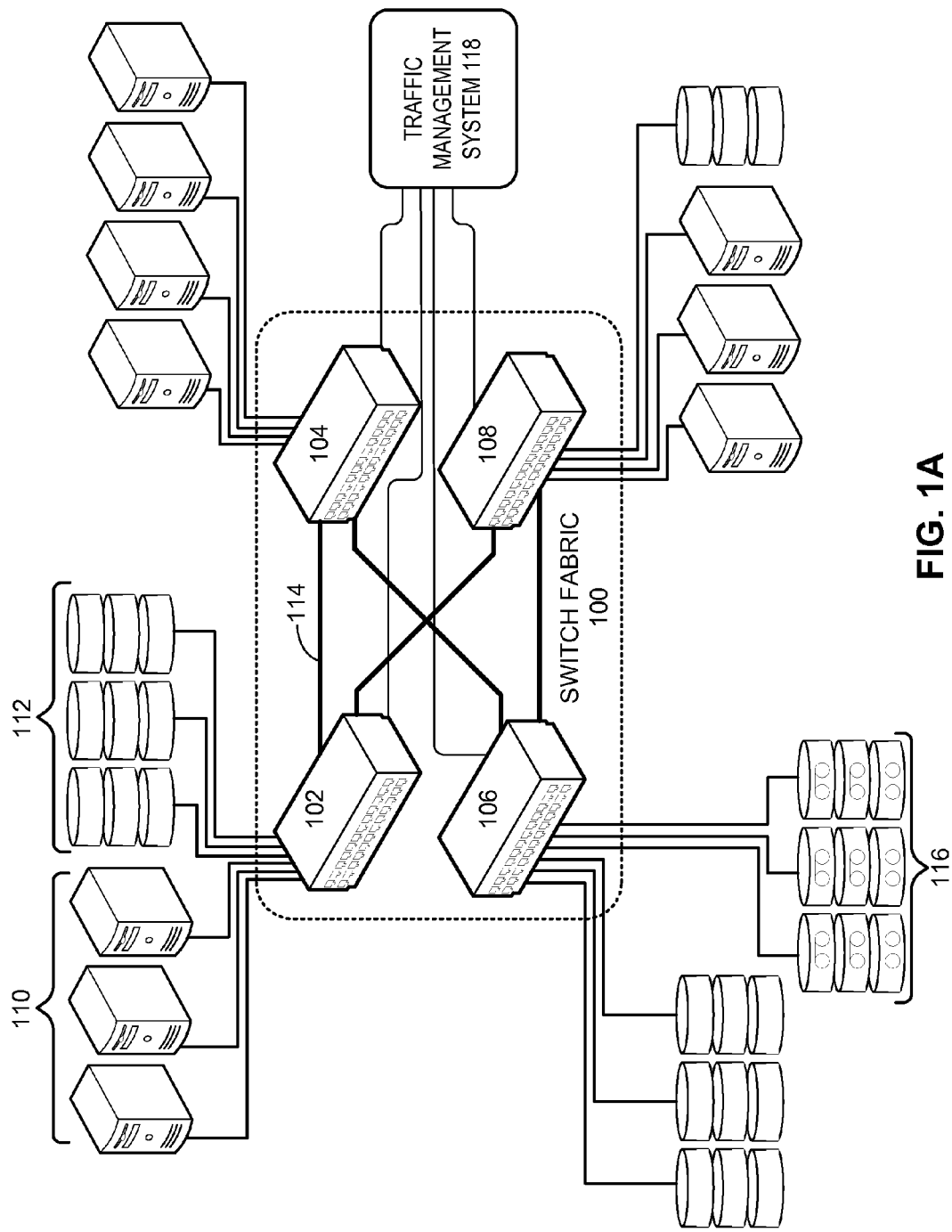
FIG. 1A illustrates an exemplary network that facilitates traffic management, in accordance with an embodiment of the present invention.

The following description is presented to enable any person skilled in the art to make and use the invention, and is provided in the context of a parti-cular application and its requirements. Various modifications to the disclosed embodiments will be readily apparent to those skilled in the art, and the general principles defined herein may be applied to other embodiments and applications without departing from the spirit and scope of the present invention. Thus, the present invention is not limited to the embodiments shown, but is to be accorded the widest scope consistent with the claims.

Overview

The increase in fabric complexity of storage area networks partially comes from the natural growth in the demand for data storage. However, the use of server and storage virtualization to enable cost-effective sharing of pooled physical resources, such as computing power and storage, contributes mostly to the recent tremendous growth of fabric complexity. It is becoming increasingly more difficult to manage the dynamic behavior of the fabric as traffic patterns shift quickly. This transformation defines important requirements for intelligent traffic management in today's networks.

Embodiments of the present invention provide a traffic management system that facilitates automatic identification of network bottlenecks and network healing to remove or mitigate such bottlenecks. Without losing generality, the system performs (1) online monitoring of traffic state at multiple switches and detection of bottlenecks; (2) offline analysis to identify primary bottlenecks and data paths affected by bottlenecks; (3) identification of data flows contributing to the primary bottlenecks; and (4) limiting the data rate at the source of the contributing data flows. As a result, latency along a data path can be reduced, and congestion at fabric ports can be minimized. The traffic management system utilizes services provided by the underlying network, such as ingress rate limiting, per-channel-based traffic monitoring services, and individual management systems on each switch. Through online and offline analysis of traffic conditions, the traffic management system can quickly identify primary and dependent bottlenecks, identify problematic data flows, and reduce the injection of bottleneck-causing data flows. The combined online and offline analysis also provide profiles of the fabric dynamics, which can be used to facilitate more efficient network provisioning.

In this disclosure, the term "channel" refers to a physical link or a virtual channel (VC) within a physical link. A channel is a directed logical link, with a sending end and a receiving end. A duplex connection is modeled as at least two directed channels.

The term "bottleneck" refers to the situation where a channel has a one or more un-transmitted data frames buffered and waiting to be transmitted on the channel. With respect to the meaning of a bottleneck, the data frames are buffered at the input end of channel, not at some distant device. A bottleneck can be caused by congestion or slow drain, as explained below.

The term "congestion" refers to the condition when a channel is bottlenecked while being fully or nearly fully utilized. That is, there are more data frames arriving at the input end of a channel than the channel can transmit at its full bandwidth. This kind of bottleneck is also referred to as a "congestion bottleneck," as opposed to a "slow-drain bottleneck" which is explained below.

The term "slow drain" refers to the condition when a channel is bottlenecked and there are no transmit credits (such as FC credits) available at its sending end. This situation is typically caused by the underlying flow-control mechanism (such as the buffer credit mechanism in FC networks), where the receiving end not returning credits or acknowledgement fast enough. Slow drain can be caused by either a slow processing speed at the receiving end, or back pressure from downstream network equipment (for example, a congested down stream channel). A slow drain often causes a channel to be under-utilized and data frames to pile up at the channel's sending end. This kind of bottleneck is referred to as a "slow-drain bottleneck."

The term "fabric" generally refers to a connected graph of network equipment within which the traffic management system operates.

The term "edge device" refers to an end device coupled to the fabric.

The term "slow-draining device" refers to a device that returns buffer credits or acknowledgements more slowly than it is fed data frames, which causes a slow-drain bottleneck where the device is coupled to the fabric.

The term "back pressure" refers to the process by which bottlenecks spread upstream in a fabric due to an end-to-end flow control mechanism, such as the FC buffer-credit mechanism.

The term "edge channel" refers to a channel between the fabric and an edge device.

Although the examples in the present disclosure are presented in a context of FC networks, embodiments of the present invention are not limited to FC networks. The method and system described herein can be implemented in other types of local-area, metro, or wide-area networks. Furthermore, the method and system described herein are not limited to one particular networks standard, and can be implemented with a wide variety of open or proprietary network standards and protocols, such as Ethernet, ATM, IP, and Fibre Channel.

Network Environment and Bottlenecks

FIG. 1A illustrates an exemplary FC network which facilitates traffic management, in accordance with an embodiment of the present invention. In this example, an FC switch fabric 100 includes four switch modules, 102, 104, 106, and 108. Each switch module is coupled to a group of network appliances.

For example, switch module 102 is coupled to a number of servers 110 and a number of disk arrays 112.

A respective edge device can communicate with any other edge device in the FC network. For example, one of the servers 110 can transfer data to and from one of tape backup devices 116. Note that, since the switch modules are not coupled in a fully meshed topology, the data frames transferred between servers 110 and tape devices 116 traverse three switch modules 102, 104, and 106. In general, the switch modules are coupled by inter-switch links (ISLs), such as ISL 114.

A switch typically has two types of ports: a fabric port (denoted as F_Port), which can couple to an edge device, and an extension port (E_Port), which can couple to another switch. An edge device communicates with a switch through a host bus adapter (HBA). The HBA provides the interface between a device's internal bus architecture and the external FC network. An HBA has at least one node port (N_Port), which couples to an F_Port on a switch through an optical transceiver and a fiber optic link. More details on FC network architecture, protocols, naming/address convention, and various standards are available in the documentation available from the NCITS/ANSI T11 committee (www.t11.org) and publicly available literature, such as "Designing Storage Area Networks," by Tom Clark, 2nd Ed., Addison Wesley, 2003, the disclosure of which is incorporated by reference in its entirety herein.

In the example in FIG. 1A, each switch module includes a traffic monitoring mechanism that monitors the traffic on each outgoing channel. This traffic-monitoring service is provided in real time (online) and can identify any congestion or slow-drain bottleneck. This bottleneck information is provided to a traffic management system 118, which in turn identifies the source of bottlenecks in the network and manages the bottleneck-causing data flows accordingly to remove such bottlenecks. Traffic management system 118 can be a stand-alone entity or incorporated into one of the switches.

Figure 1B:
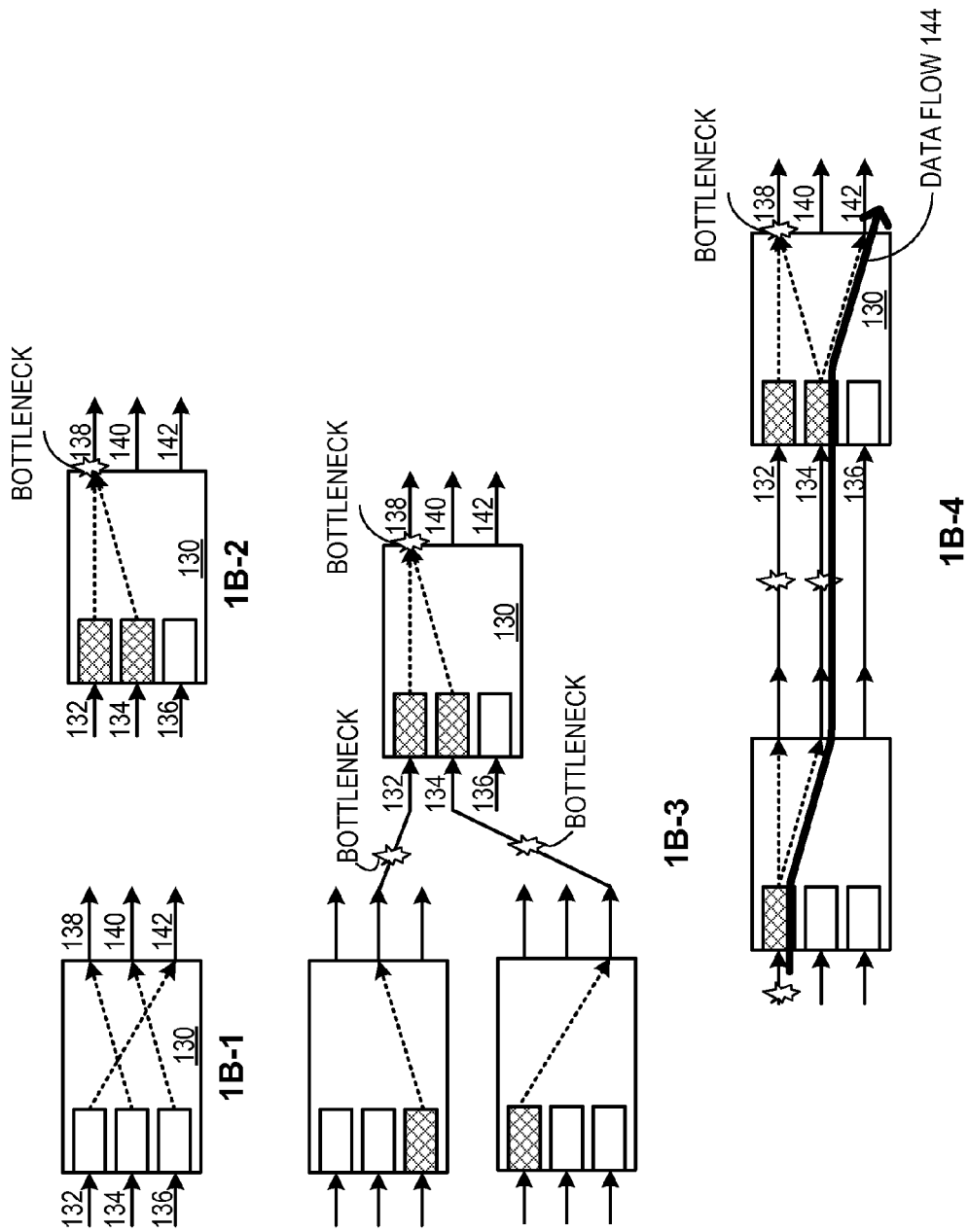
FIG. 1B illustrates examples of network bottlenecks.

FIG. 1B illustrates examples of network bottlenecks. Example 1B-1 shows a switching element 130 with three incoming channels, 132, 134, and 136 and three outgoing channels, 138, 140, and 142. Also shown are data frame buffers conceptually located at the receiving end of each incoming channel. These buffers hold frames arriving at the switch's application-specific integrated circuit (ASIC). Note that the channels may be VCs or physical links, and the description below would hold in either case.

In example 1B-1, each incoming channel carries a data flow destined to a different outgoing channel (as indicated by the dotted lines). There is no bottleneck in this scenario, because the data frames can be transmitted by the switch as they arrive at the incoming channels, and there is no data build-up in any of the buffers.

Example 1B-2 illustrates a bottleneck situation incurred to switch 130 when outgoing channel 138 is fed frames faster than it is allowed to transmit. These frames are fed by two incoming channels, 132 and 134. The bottleneck situation arises either because outgoing channel 138 is not receiving credits sufficiently fast from the receiving end of channel 138 (i.e., a slow-drain bottleneck), or because outgoing channel 138 is simply not fast enough to transmit at the rate it is being fed (i.e., a congestion bottleneck). The buffers associated with incoming channels 132 and 134, which are feeding outgoing channel 138, can quickly fill up with frames destined for outgoing channel 138.

Example 1B-3 illustrates how a bottleneck can cause other channels on upstream switches to become bottlenecks. In this example, channels 132 and 134, which feed to the bottleneck channel 138, become bottlenecks themselves, because the back pressure from channel 138 eventually propagates to the upstream channels. Note that, although channel 138 is a congestion bottleneck, channels 132 and 134 are actually slow-drain bottlenecks, because the slow data rates on channels 132 and 134 are caused by the slow processing of the data frames in their respective receive buffers (and the corresponding slow return of buffer credits on these channels).

The bottlenecks on channels 132 and 134 can cause bottlenecks further upstream. In other words, once a channel becomes a bottleneck, the back pressure due to the flow control mechanism (such as FC buffer-credit mechanism) can cause the bottleneck to propagate upstream along the data flows contributing to this bottleneck.

Example 1B-4 shows how innocent data flows can be adversely affected by the presence of the original bottleneck that has caused other channels to become bottlenecks. In this example, data flow 144 (as indicated by a thick line) suffers from the bottleneck on channel 134, although data flow 144 does not contribute to the original bottleneck at channel 138. In general, a bottleneck can propagate upstream along the reverse direction of a data flow, turning other channels into bottlenecks, and slowing down flows sharing those channels.

In one embodiment, each switch in the fabric reports its bottlenecks to the traffic management system. However, it is desirable not to report bottlenecks caused by other bottlenecks (such as bottlenecks on channels 132 and 134 in example 1B-4), or report sufficient information so that the traffic management system can make the distinction. This disclosure uses two terms, "primary bottleneck" and "dependent bottleneck," to describe this distinction.

In general, a channel is a primary bottleneck if:

(a) it is an egress edge channel that is bottlenecked due to a slow-draining device at its receiving end, (b) it is a fabric or egress edge channel that is bottlenecked because it does not have sufficient credits for the bandwidth-delay product of the channel (i.e., it is not allocated sufficient credits to keep the transmission pipe full), or (c) it is a fabric or egress edge channel bottlenecked due to congestion on it.

A channel is a dependent bottleneck if its bottleneck is caused by a downstream primary bottleneck. Remedying a primary bottleneck can automatically remedy the associated dependent bottlenecks. In example 1B-4, all bottlenecked channels except channel 138 are dependent bottlenecks. Channel 138 may be primary or dependent, based on whether it is the root cause of the bottleneck.

In general, there are three factors for consideration in classifying bottlenecks: (1) conditions on the channel (slow-drain or congestion), (2) distance from the root cause (primary or dependent), and (3) location of the channel: fabric or edge. These three classification criterion result in eight combinations. Congestion bottlenecks, regardless of whether they are on a fabric channel or edge channel, are always primary bottlenecks by definition, and can arise anywhere. Slow-drain bottlenecks are primary when they arise on edge channels, and primary or dependent when they arise on fabric channels (they can be primary when the cause is insufficient credit allocation for the bandwidth-delay product of the channel).

A goal of bottleneck detection is to report the type of a bottleneck, that is, slow-drain or congestion, primary or dependent. In one embodiment, the traffic mentoring ASIC on a switch can distinguish slow-drain bottlenecks from congestion bottlenecks. However, it might not be easy to distinguish primary from dependent bottlenecks—a slow-drain bottleneck on a fabric channel can be a primary or dependent bottleneck.

To overcome this limitation, in one embodiment, the system assumes that slow-drain bottlenecks due to insufficient credit allocation cannot arise on fabric channels. This assumption is generally valid, because a properly configured SAN channel has adequate credits for its bandwidth-delay product, even on long-distance links. With this assumption, the system is able to distinguish primary from dependent bottlenecks based on the location (fabric or edge) and condition (congestion or slow drain) of the bottleneck.

Traffic Management System

Figure 2A:
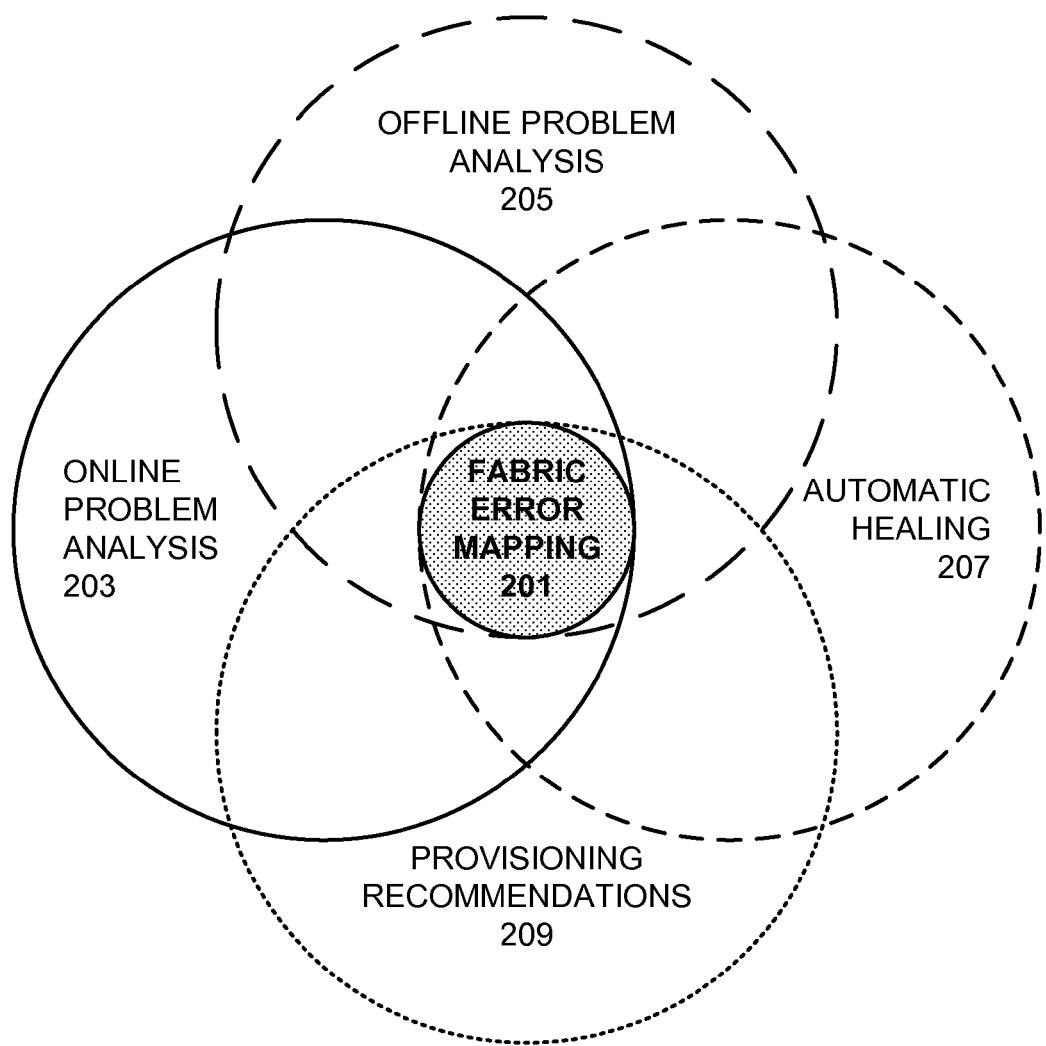
FIG. 2A illustrates the operation of a fabric-level traffic management system, in accordance with an embodiment of the present invention.

As illustrated in FIG. 2A, the traffic management system performs four types of operations: online analysis 203, offline analysis 205, automatic healing 207, and provisioning recommendations 209. At the core of these four types of operation is fabric error mapping 201. Fabric error mapping 201 serves as the underpinning for all four types of operations.

Online problem analysis 203 is performed in real time in a running fabric, whereas offline problem analysis 205 provides network forensics through post-processing. An example of online problem analysis is to detect bottlenecks in real time. In some embodiments, the online bottleneck detection is performed by each switch, specific to each of its outgoing channels, in a distributed fashion. Each switch can report whether a primary or dependent bottleneck has been detected on one or more of its outgoing channels using the bottleneck classification criterion described above. The bottleneck-related traffic information (or, in more general terms, the network state information) is reported to the traffic management system. The reporting can be performed periodically or in real time.

Offline problem analysis 205, on the other hand, offers post-processing of data collections on zoning, performance, and history of reboots and failovers, and isolating errors after gathering all these data. In one embodiment, during offline analysis, the traffic management system can identify the data paths that are affected by the bottlenecks and data flows contributing to a primary bottleneck. In one embodiment, the bottleneck information collected from the switches and the network topology information are used to identify the back pressure paths. The system can further query the traffic monitoring process running on the bottleneck switch based on the identified back pressure paths to determine which data flows are contributing to the bottleneck. (It is assumed that each switch maintains the state information of the data flows going through each outgoing channel.) Based on the online and offline analysis, the traffic management system can then automatically heal the detected problems by limiting the data rate from the source of a contributing data flow, thereby removing the bottleneck. Online and offline analysis also help answering questions on network provisioning, such as the best place for a customer to couple a new server to the switch fabric.

In some embodiments, a general fabric-error-mapping engine collects bottleneck indicators and traffic statistics from the entire switch fabric. The fabric-error-mapping engine represents the topology of the switch fabric in a data structure (for example a directed graph), and overlays the error indicators onto the data structure for global online or offline bottleneck detection. It also performs analysis and inference from the data structure to identify and isolate bottlenecks. In one embodiment, the fabric-error-mapping engine can run in the switch fabric as distributed agents to facilitate better scalability.

Figure 2B:
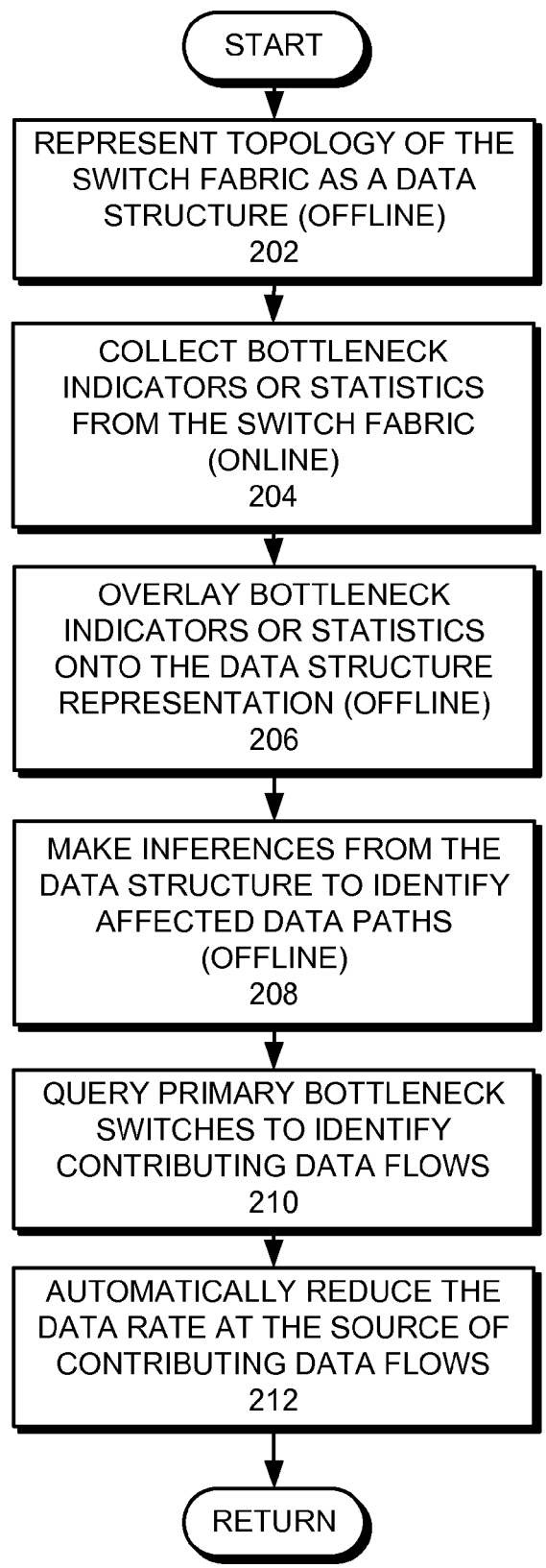
FIG. 2B presents a flowchart illustrating the process of facilitating fabric error mapping in a network, in accordance with an embodiment of the present invention.

FIG. 2B presents a flowchart illustrating the process of facilitating fabric error mapping in a network, in accordance with an embodiment of the present invention. During operation, the system represents the fabric topology in a data structure, which can be performed offline (operation 202). The distributed fabric-error-mapping agents or a centralized fabric-error-mapping engine then collects bottleneck indicators or traffic statistics from the entire fabric, which is performed online (operation 204). Next, the system overlays the bottleneck indicator onto the data structure representation of the fabric topology (operation 206). The system then makes inferences from the data structure to identify the affected data paths (operation 208). Based on the affected data paths, the system further queries the primary bottleneck switches to identify the contributing data flows (operation 210). The system then automatically reduces the data rate at the source of the contributing data flows, thereby removing the cause of the bottleneck (operation 212).

Online and Offline Analysis

The online analysis facilitates prompt identification of fabric-level data-path problems in a running switch fabric. As described above, bottlenecks spread upstream in a switch fabric due to end-to-end flow control, which causes undesirable degradation in throughput on various data paths. In one embodiment, each switch monitors in real time the state of the transmission buffer of its outgoing channels, and detects when a bottleneck occurs. Each switch reports to the traffic management system when a bottleneck is detected. The goal of online bottleneck detection is to detect primary bottlenecks that are the root cause of the throughput degradation so that automatic or manual healing can be applied by the traffic management system. In one embodiment, the mapping of the bottlenecks to back pressure data paths can be conducted offline. However, the demarcation between online and offline analysis does not need to be clearly defined. In other words, what is performed online (in real time) and offline can be determined based on system resource and requirement. When sufficient processing power is available, most or all of the data-path mapping function can be performed online.

Figure 3:
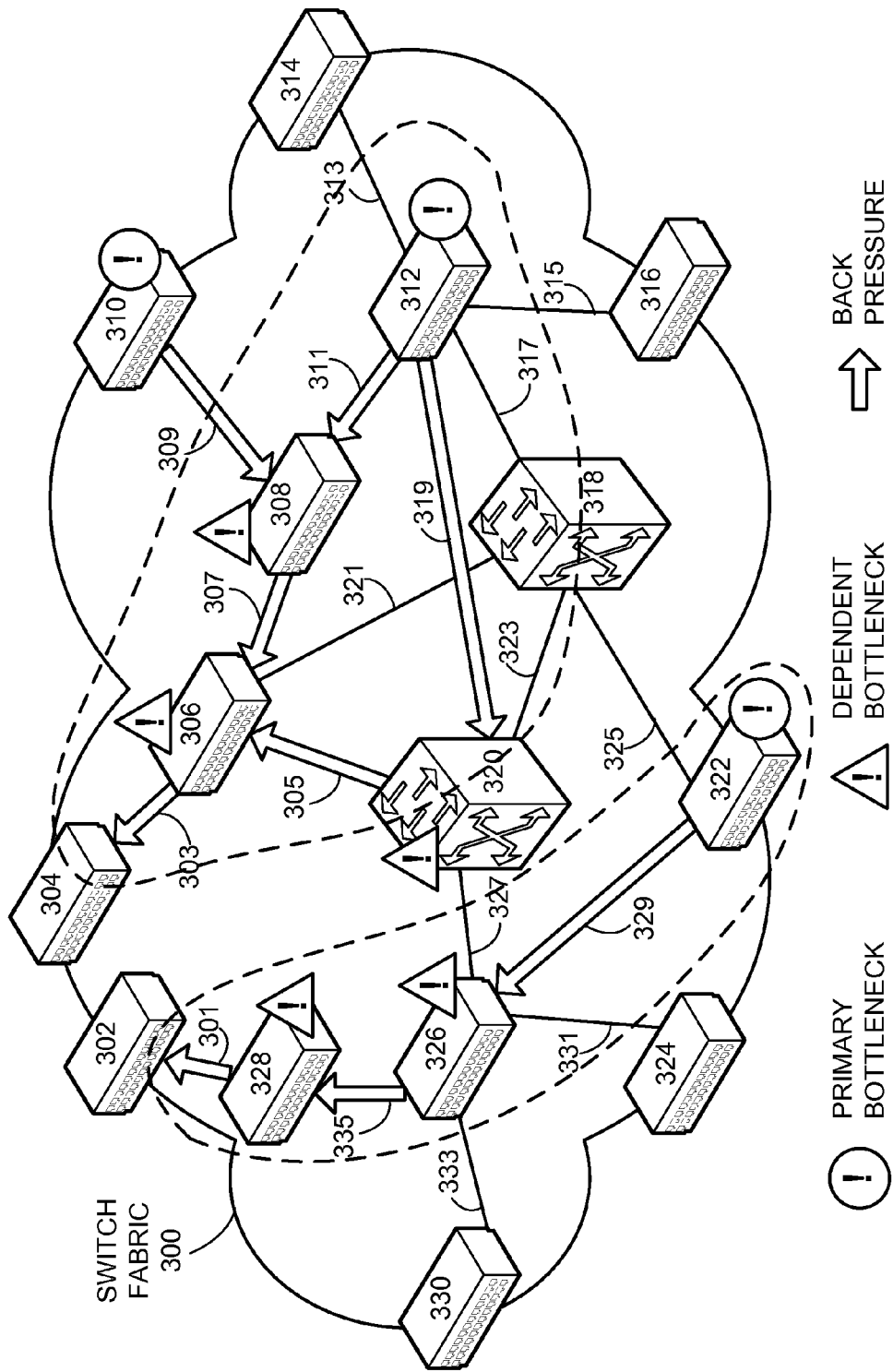
FIG. 3 illustrates an exemplary case of online bottleneck detection using fabric error mapping, in accordance with an embodiment of the present invention.

FIG. 3 illustrates an exemplary case of online bottleneck detection using fabric error mapping, in accordance with an embodiment of the present invention. A switch fabric 300 includes fifteen switches 302, 304, 306, 308, 310, 312, 314, 316, 318, 320, 322, 324, 326, 328, and 330, which are inter-coupled by inter-switch links 301, 303, 305, 307, 309, 311, 313, 315, 317, 319, 321, 323, 325, 327, 329, 331, 333, and 335.

Assume that switches 306, 308, 310, 312, 320, 322, 326, and 328 have been identified as bottlenecks in switch fabric 300. Bottlenecks can be measured and identified by each individual switch and reported online to the traffic management system. In one embodiment, to detect primary bottlenecks among the identified bottlenecks, the traffic management system represents the topology of switch fabric 300 with a directed graph. Graphs are mathematical data structures used to model pair-wise relations between objects from a data set. To represent the topology of the switch fabric with a graph, each switch is represented by a node or a vertex, and each unidirectional link coupling a pair of switches is represented by a directed edge between the corresponding nodes. Graphs can be stored as data structures in a computer system, and graph algorithms can be used to analyze graphs.

Once the topology of switch fabric 300 is represented by a graph, the identified bottlenecks are mapped onto the graph to detect back pressure paths through graph analysis. For example, back pressure paths are identified based on the classification of the bottlenecks at each node and the network topology. The back pressure paths can also be optionally determined by the timeline of bottleneck occurrences at each switch and the directions of the data flows causing the bottlenecks. In FIG. 3, the back pressure paths identified are: (322→326→328→302), (310→308→306→304), (312→308→306→304), and (312→320→306→304). It can be inferred that the primary bottlenecks are indeed the origin nodes in the detected back pressure paths: 310, 312, and 322. Graph analysis can further isolate the bottlenecks by showing that the back pressure path (322→326→328→302) does not share a link or a node with the other three back pressure paths and, therefore, is an isolated bottleneck problem.

Figure 4:
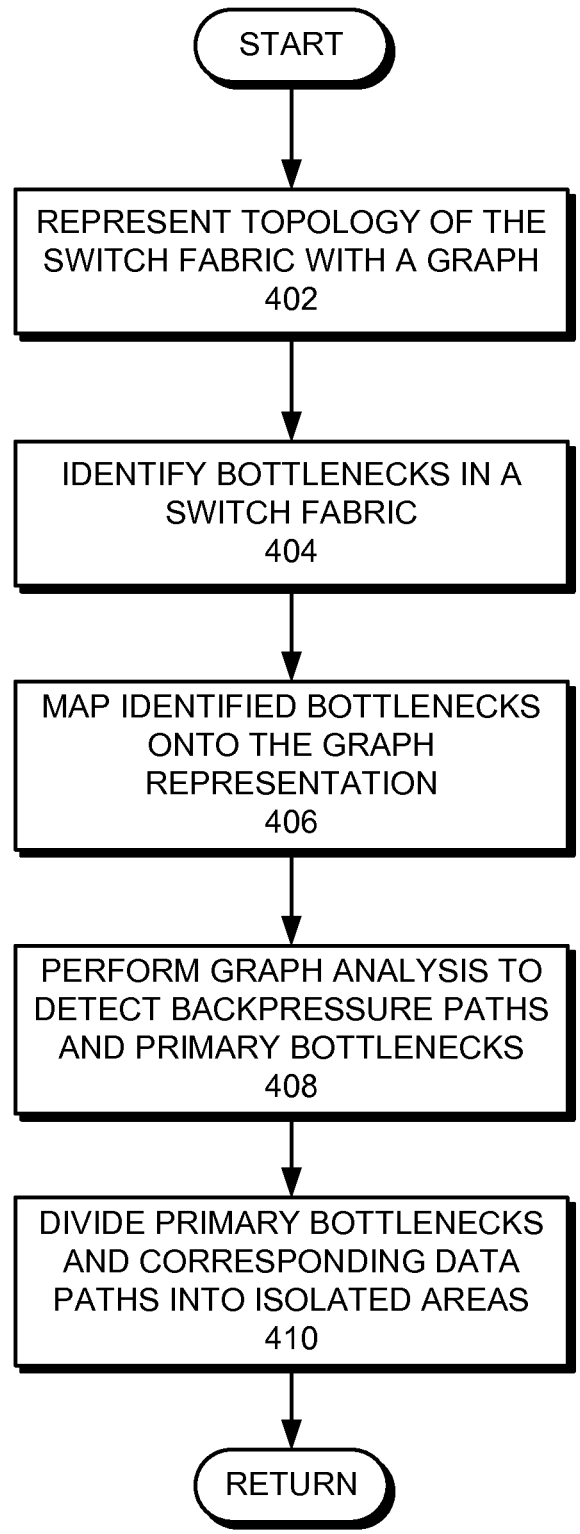
FIG. 4 presents a flowchart illustrating the process of identifying back pressure paths, in accordance with an embodiment of the present invention.

FIG. 4 presents a flowchart illustrating the process of identifying back pressure paths, in accordance with embodiments of the present invention. Note that this process is a specific instance of the general operation described in conjunction with the flowchart in FIG. 2B. During operation, the traffic management system first represents the topology of the switch fabric with a graph (operation 402). The system then identifies bottlenecks in a switch fabric based on the network state information reported by one or more switches (operation 404). Subsequently, the system maps the identified bottlenecks onto the graph representation (operation 406). By performing graph analysis based on the bottleneck-classification information and the network topology, the system identifies back pressure paths and primary bottlenecks (operation 408). The primary bottlenecks and back pressure paths can be further divided into isolated areas (operation 410).

Automatic Healing

Based on the online and offline analysis, it is possible for the traffic management system to automatically heal the problems detected in the switch fabric. For example, in the case of online bottleneck detection, fabric error mapping helps identify the back pressure paths and primary bottlenecks. Based on the back pressure paths and the location of primary bottlenecks, the system can discover the data flows that cause the primary bottlenecks and apply rate limiting at the source of these data flows. As a result, the bottlenecks can be removed.

In one embodiment, the system uses queries to the traffic monitoring process running on each switch to discover all the data flows within a primary bottleneck channel. Upon receiving a query, the traffic monitoring process returns the source-destination pairs of the data flows which are transmitted via the channel specified in the query. This information can be provided on a channel-by-channel basis and can be processed to generate a fabric-wide tabulation of which application workloads consume the most fabric bandwidth. The traffic management system then selects the data flow(s) with source-destination pair(s) that match the identified back pressure path. In addition, a switch's traffic monitoring process can return information about data flows in an order based on their traffic volume. Knowing which flows are generating the most traffic helps the traffic management system determine where to set ingress rate limits to remove bottlenecks in the most effective way.

Figure 5:
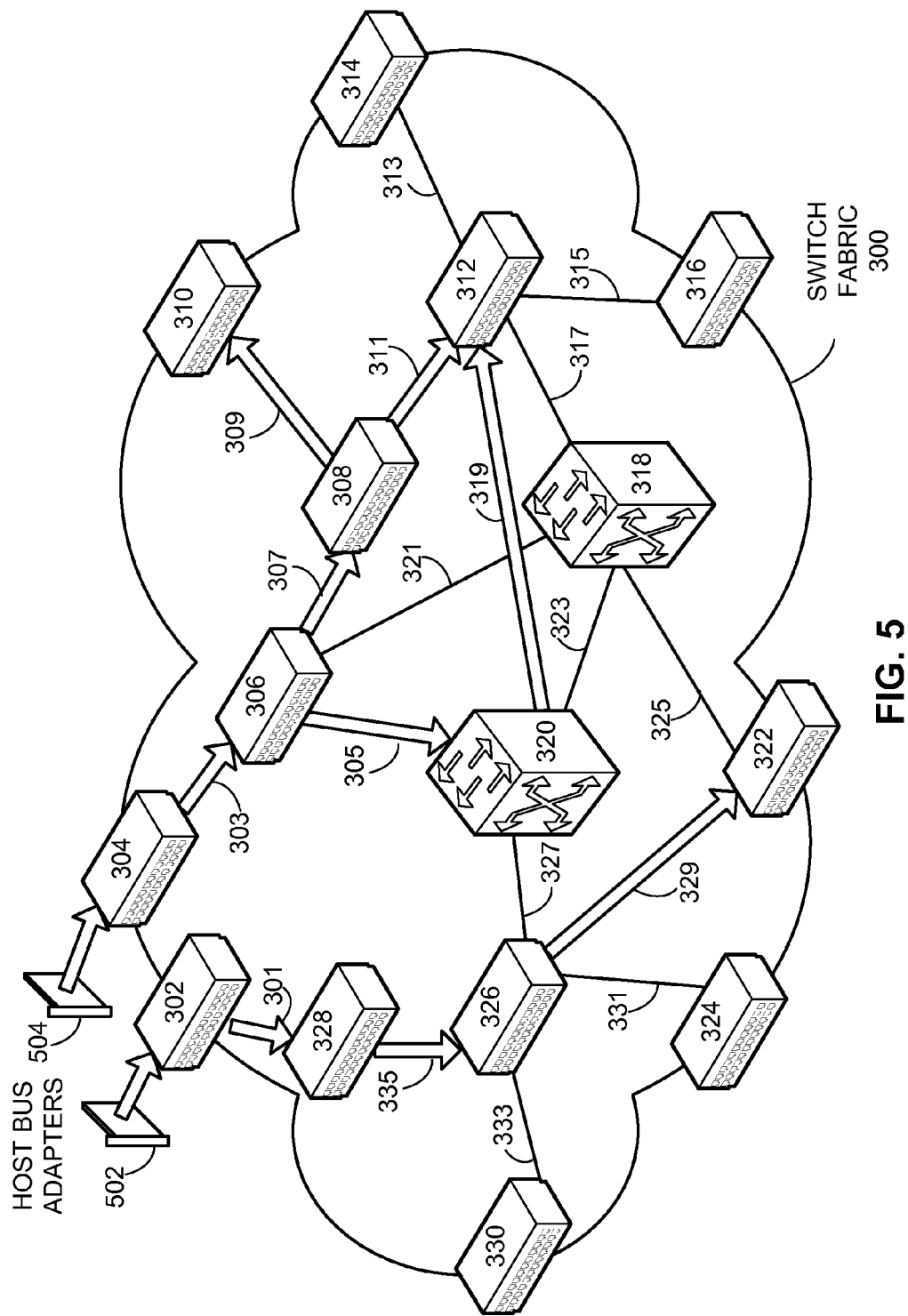
FIG. 5 illustrates an exemplary case of automatic network healing to remove bottlenecks, in accordance with an embodiment of the present invention.

FIG. 5 illustrates an exemplary case of automatic healing to remove bottlenecks, in accordance with an embodiment of the present invention. As previously shown in FIG. 3, switches 310, 312, and 322 are detected to be primary bottlenecks. The traffic management system, or each of switches 310, 312, and 322, can issue a query to their respective traffic monitoring process. In response, switches 310, 312, and 322 returns information about all the data flows going through the primary bottleneck channels. The traffic management system then compares the data flows to the previously identified back pressure paths, and determine which data flows are contributing to the primary bottleneck channel. In the example of FIG. 5, the results of the queries show that the offending flows causing the bottleneck on switch 322 enter switch fabric 300 from an ingress port on switch 302, and the offending flows causing the bottleneck on switches 310 and 312 enter switch fabric 300 from an ingress port on switch 304. Based on these discoveries, automatic healing on the bottlenecks is possible by applying rate limiting on these ingress ports.

Ingress rate limiting is a technique that allows an administrator to limit the throughput on the ingress port of an FC switch, thereby reducing flow volumes entering the switch fabric. Ingress rate limiting requires the administrator to set a maximum bandwidth manually on the F_Port to alleviate the bottlenecks and proactively avoid future congestions. In one embodiment, ingress ports on switches 302 and 304 in FIG. 5 are configured to limit the throughput to automatically heal the bottleneck problems. In addition, the two corresponding host bus adapters (HBAs) 502 and 504 are signaled to reduce their respective data rate. HBAs 502 and 504 are each configured with a maximum data rate they can send to prevent congestion.

Figure 6:
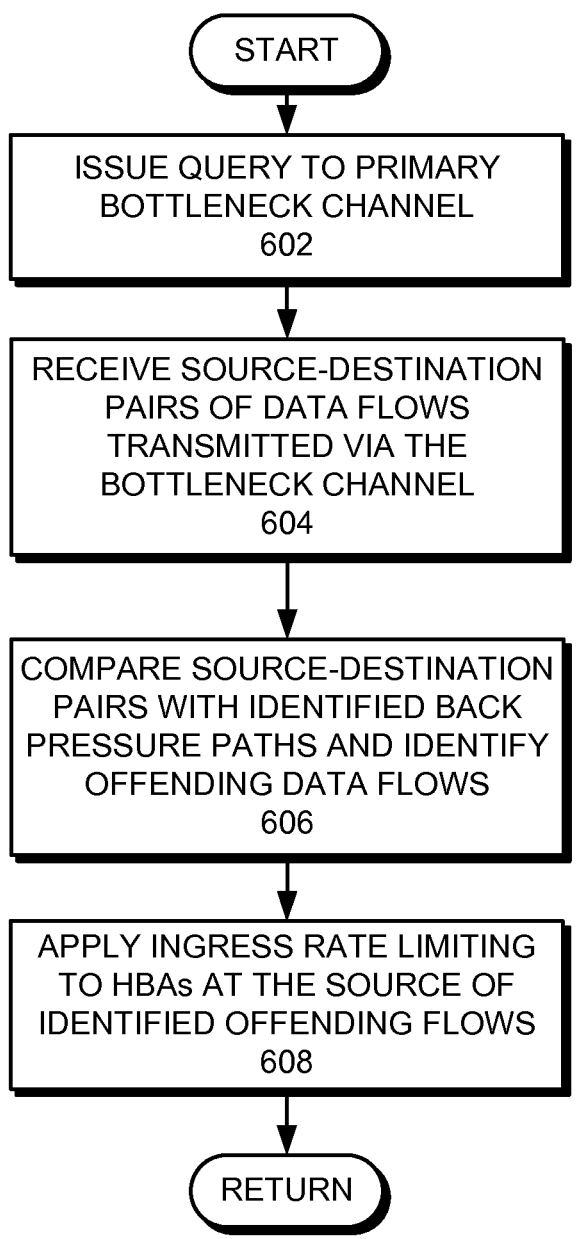
FIG. 6 presents a flowchart illustrating the process of automatic network healing to remove bottlenecks, in accordance with an embodiment of the present invention.

FIG. 6 presents a flowchart illustrating the process of automatic healing to remove bottlenecks, in accordance with an embodiment of the present invention. During operation, the traffic management system first issues a query to the bottleneck channel which has been previously identified as a primary bottleneck (operation 602). In response, the system receives source-destination pairs of data flows transmitted via the bottleneck channel (operation 604). Subsequently, the system compares the source-destination pairs with the identified back pressure paths and identifies the offending data flows (operation 606). The system then applies ingress rate limiting to the HBAs corresponding to the source of the offending data flows (operation 608).

Provisioning Recommendations

Figure 7:
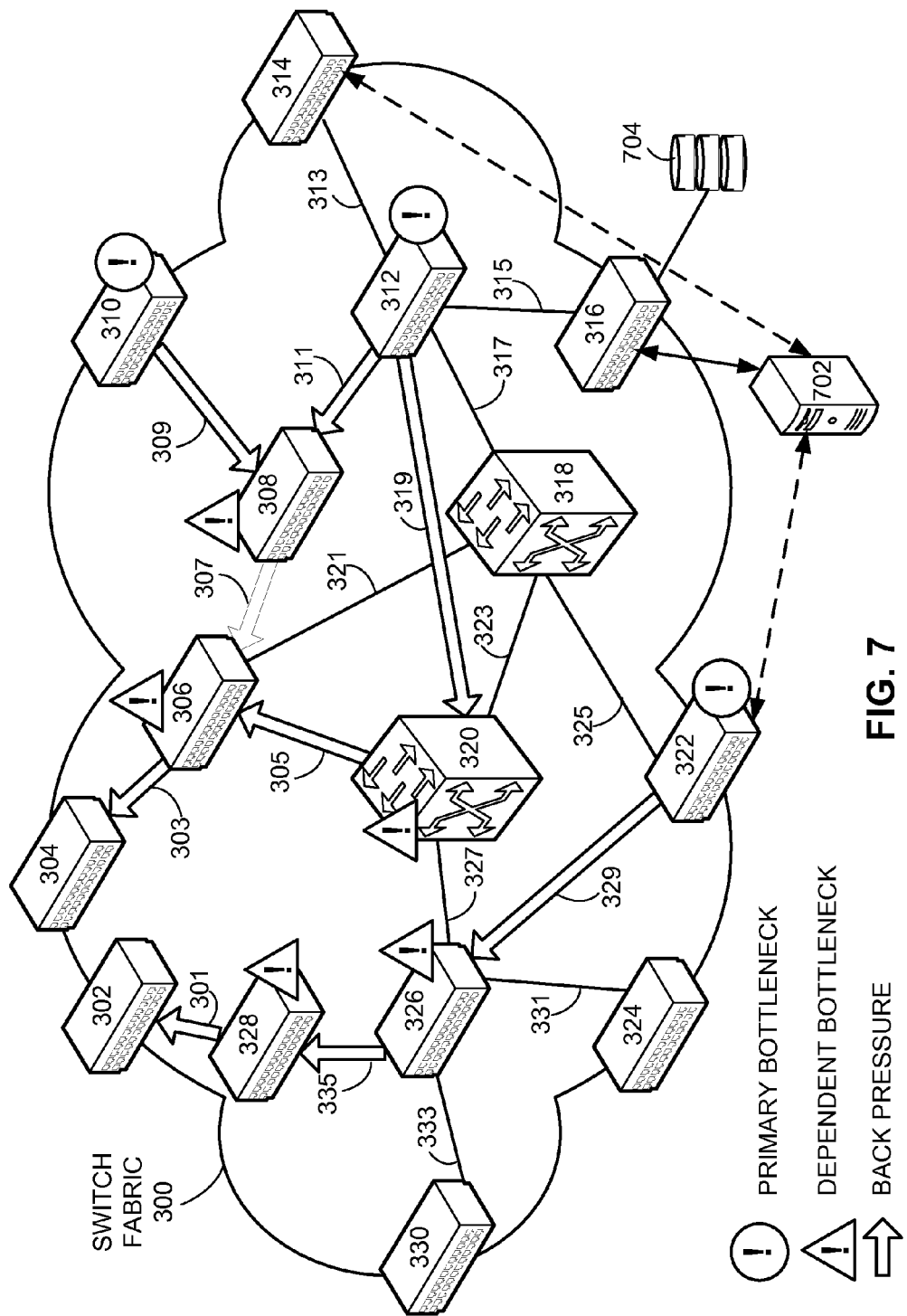
FIG. 7 illustrates an exemplary case of recommending provisioning solutions by the traffic management system, in accordance with an embodiment of the present invention.

FC network provisioning is the process of preparing and equipping an FC network to provide services to its users. The fabric error mapping not only identifies and isolates end-to-end problems in the fabric, but also provides profiles about baseline resource utilization across the entire fabric. This advanced profiling can be used to support FC network provisioning and capacity planning FIG. 7 illustrates an exemplary case of recommending provisioning decisions by the traffic management system, in accordance with an embodiment of the present invention. In this example, a host 702 requests to attach to switch fabric 300 for accessing a disk array 704, which is coupled to switch 316. It is possible for host 702 to couple to switches 314, 316, or 322. Considering the bottlenecks and back pressure paths which are detected exactly as shown in FIG. 3, coupling through switch 316 is recommended by the provisioning system to avoid bottlenecks. Note that switch 322 is a primary bottleneck, but switch 314 is neither a primary bottleneck nor a dependent bottleneck. However, if host 702 were coupled to switch 314, the data path would pass through switch 312, which is a primary bottleneck. Therefore, the provisioning recommendation excludes switches 322 and 314. In one embodiment, the system indicates a port on switch 316 where host 702 can be plugged in.

Traffic Management System

Figure 8:
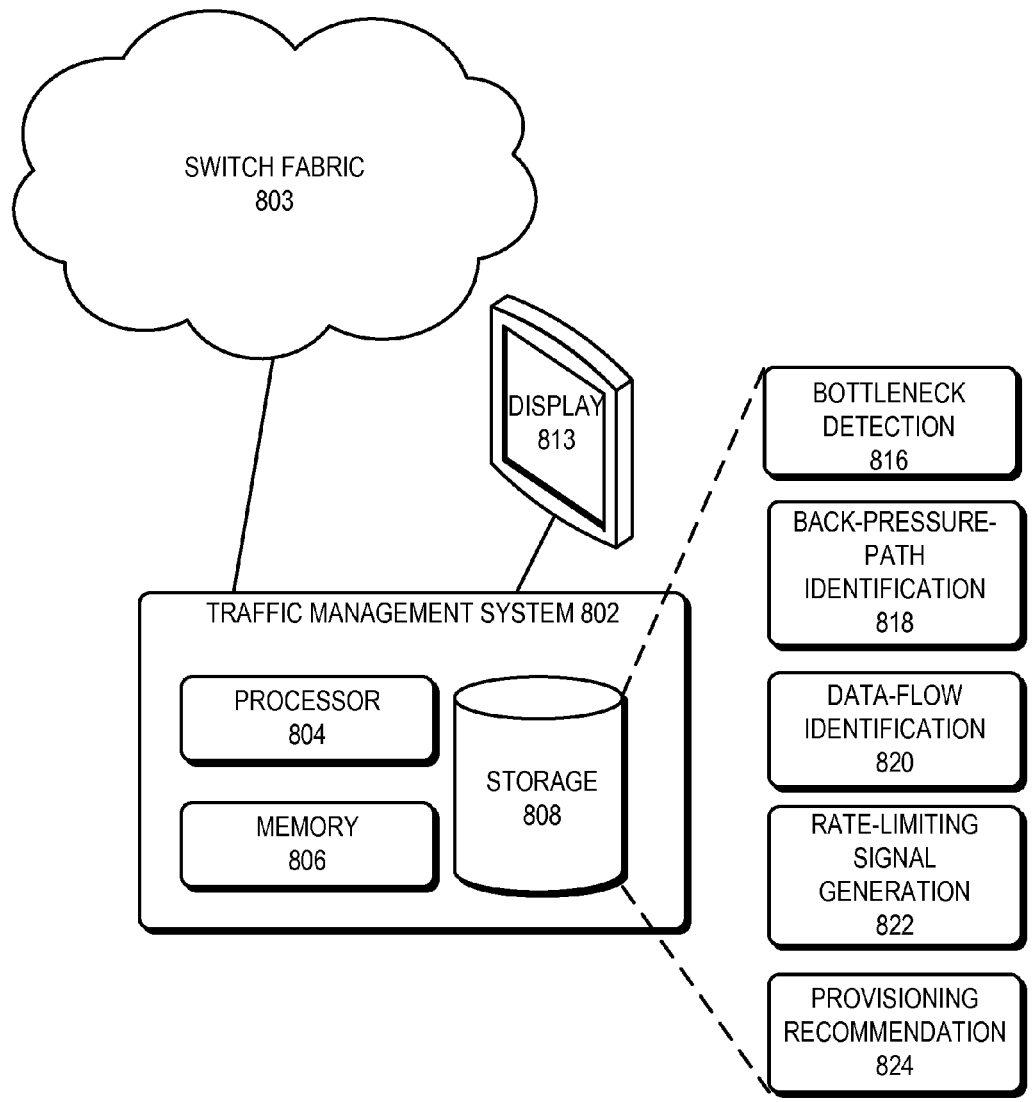
FIG. 8 illustrates a system that facilitates traffic management a network, in accordance with one embodiment of the present invention.

FIG. 8 illustrates a system that facilitates traffic management a network, in accordance with one embodiment of the present invention. A traffic management system 802 includes a processor 804, a memory 806, and a storage device 808. Traffic management system 802 is also coupled to a switch fabric 803 and a display device 813. Storage device 808 stores a number of application modules, including a bottleneck detection module 816, a back-pressure-path identification module 818, a data-flow identification module 820, a rate-limiting signal generation module 822, and a provisioning recommendation module 824. During operation, these application modules are loaded into memory 806 and executed by processor 804 to perform their respective functions, as described above.

In summary, embodiments of the present invention facilitate traffic management in a network. The traffic management system collects bottleneck indicators and statistics from the entire switch fabric in real time. The system identifies data paths that are affected by the bottlenecks based on the network topology and back-pressure tracking. The system further identifies data flows contributing to the bottlenecks by querying the traffic monitoring process with respect to each primary bottleneck channel. The traffic management system can then remove the bottlenecks and heal the network by limiting the ingress data rate at the source (e.g., the HBA) of each offending data flow. The traffic management system can also provide recommendations on network provisioning based on the online and offline analysis of network bottlenecks.

The foregoing descriptions of embodiments of the present invention have been presented only for purposes of illustration and description. They are not intended to be exhaustive or to limit this disclosure. Accordingly, many modifications and variations will be apparent to practitioners skilled in the art. The scope of the present invention is defined by the appended claims.

What is claimed is:

1. A system comprising:
   a bottleneck-detection mechanism configured to detect a bottleneck in a network based on network-state information received from one or more switches, wherein the network-state information indicates whether a channel is experiencing a slow drain;
   a data-flow identification mechanism configured to identify a data flow that contributes to the bottleneck, wherein while identifying the data flow the data-flow identification mechanism is further configured to:
      represent the switches in the network in a data structure that corresponds to the network topology;
      map the received network-state information to the network topology represented by the data structure to identify a data path which is affected by the bottleneck;
      issue a query to a data channel corresponding to the bottleneck;
      in response to the query, receive information which identifies one or more data flows transmitted via the bottleneck channel; and
      determine one or more of the data flows to be offending data flows which contribute to the bottleneck, based on the identified data path which is affected by the bottleneck; and
   a rate-limiting mechanism configured to generate a signal to reduce the data flow from the data flow's source device.

2. The system of claim 1, wherein the network-state information is collected in real time.

3. The system of claim 1, wherein the network-state information further indicates one or more of the following:
   whether a channel is fully or nearly fully utilized and experiencing congestion; and
   whether a channel is coupled to an edge device.

4. The system of claim 1, wherein the bottleneck is a primary bottleneck channel on a switch, which:
   is experiencing congestion while being fully or nearly fully utilized; or
   is coupled to an edge device and receives insufficient credits from the edge device, which prevents the channel from being fully or nearly fully utilized.

5. The system of claim 1, wherein the signal is configured to instruct the source device to limit the data rate on a host bus adapter on the source device.

6. The system of claim 1, wherein a channel is a physical link or a virtual channel on a physical link.

7. The system of claim 1, further comprising a port-indication mechanism configured to indicate a port on a switch to which an edge device can be coupled based at least on the detected bottleneck.

8. A method comprising:
   detecting a bottleneck in a network based on network-state information received from one or more switches, wherein the network-state information indicates whether a channel is experiencing a slow drain;
   identifying a data flow that contributes to the bottleneck, wherein identifying the data flow comprises:
      representing the switches in the network in a data structure that corresponds to the network topology;
      mapping the received network-state information to the network topology represented by the data structure to identify a data path which is affected by the bottleneck;
      issuing a query to a data channel corresponding to the bottleneck;
      in response to the query, receiving information which identifies one or more data flows transmitted via the bottleneck channel; and
      determining one or more of the data flows to be offending data flows which contribute to the bottleneck, based on the identified data path which is affected by the bottleneck; and
   generating a signal to reduce the data flow from the data flow's source device.

9. The method of claim 8, wherein the network-state information is collected in real time.

10. The method of claim 8, wherein the network-state information further indicates one or more of the following:
    whether a channel is fully or nearly fully utilized and experiencing congestion; and
    whether a channel is coupled to an edge device.

11. The method of claim 8, wherein the bottleneck is a primary bottleneck channel on a switch, which:
    is experiencing congestion while being fully or nearly fully utilized; or
    is coupled to an edge device and receives insufficient credits from the edge device, which prevents the channel from being fully or nearly fully utilized.

12. The method of claim 8, wherein the signal is configured to instruct the source device to limit the data rate on a host bus adapter on the source device.

13. The method of claim 8, wherein a channel is a physical link or a virtual channel on a physical link.

14. The method of claim 8, further comprising indicating a port on a switch to which an edge device can be coupled based at least on the detected bottleneck.

* * * * *